United States Patent
Jami et al.

(10) Patent No.: US 6,944,458 B2
(45) Date of Patent: Sep. 13, 2005

(54) METHOD OF SELECTING LENGTH OF TIME OF INACTIVITY ON A CHANNEL DEDICATED TO A USER TERMINAL TO BE DETECTED FOR THE CHANNEL TO BE RELEASED, AND A CORRESPONDING NETWORK FOR RADIO TELECOMMUNICATIONS

(75) Inventors: Iqbal Jami, Swindon (GB); Paul William Piggin, Chippenham (GB)

(73) Assignee: Lucent Technologies Inc., Murray Hill, NJ (US)

( * ) Notice: Subject to any disclaimer, the term of this patent is extended or adjusted under 35 U.S.C. 154(b) by 284 days.

(21) Appl. No.: 10/449,178

(22) Filed: May 30, 2003

(65) Prior Publication Data

US 2003/0236094 A1 Dec. 25, 2003

(30) Foreign Application Priority Data

Jun. 24, 2002 (GB) .............................. 0214518

(51) Int. Cl.[7] .............................................. H04Q 7/20
(52) U.S. Cl. ........................ 455/450; 455/509; 455/516
(58) Field of Search .......................... 455/450, 452.2, 455/455, 516, 522, 509, 561; 370/318, 404, 329, 335, 320, 465, 454, 459

(56) References Cited

U.S. PATENT DOCUMENTS

| | | | |
|---|---|---|---|
| 5,392,287 A | | 2/1995 | Tiedemann, Jr. et al. .. 370/95.1 |
| 5,806,007 A | | 9/1998 | Raith et al. ................. 455/574 |
| 6,058,289 A | | 5/2000 | Gardner et al. ............ 455/31.3 |
| 6,169,880 B1 | | 1/2001 | La Fratta et al. .......... 455/11.1 |
| 6,249,681 B1 | * | 6/2001 | Virtanen ..................... 455/466 |
| 6,473,419 B1 | * | 10/2002 | Gray et al. ................. 370/349 |
| 2001/0036831 A1 | * | 11/2001 | Rezaiifar et al. ........... 455/455 |
| 2002/0031119 A1 | * | 3/2002 | Brouet et al. ............... 370/386 |
| 2002/0160812 A1 | * | 10/2002 | Moshiri-Tafreshi et al. 455/561 |
| 2005/0063304 A1 | * | 3/2005 | Sillasto et al. .............. 370/229 |

FOREIGN PATENT DOCUMENTS

| | | | | |
|---|---|---|---|---|
| EP | 0 892 571 A2 | 1/1999 | ............ | H04Q/7/38 |
| EP | 1 150 462 A1 | 10/2001 | ............ | H04L/12/56 |
| JP | 9322238 A | 12/1997 | ............ | H04Q/7/38 |

* cited by examiner

Primary Examiner—Charles N. Appiah

(57) ABSTRACT

A method is provided of selecting length of time of inactivity on a channel dedicated by a telecommunications base station to communications with a first user terminal to be detected for the channel to be released for use by another user terminal. The length of time is selected dependent upon the expected base station transmit power required for communications to the first user terminal.

18 Claims, 5 Drawing Sheets

Proposed solution to illustrate user specific inactivity timer

Use of channel resources by dedicated channels

The use of an inactivity timer

Sharing dedicated channel resources via inactivity timer

Base station power duty cycle due to data inactivity

Power thresholds and the
corresponding inactivity timer values

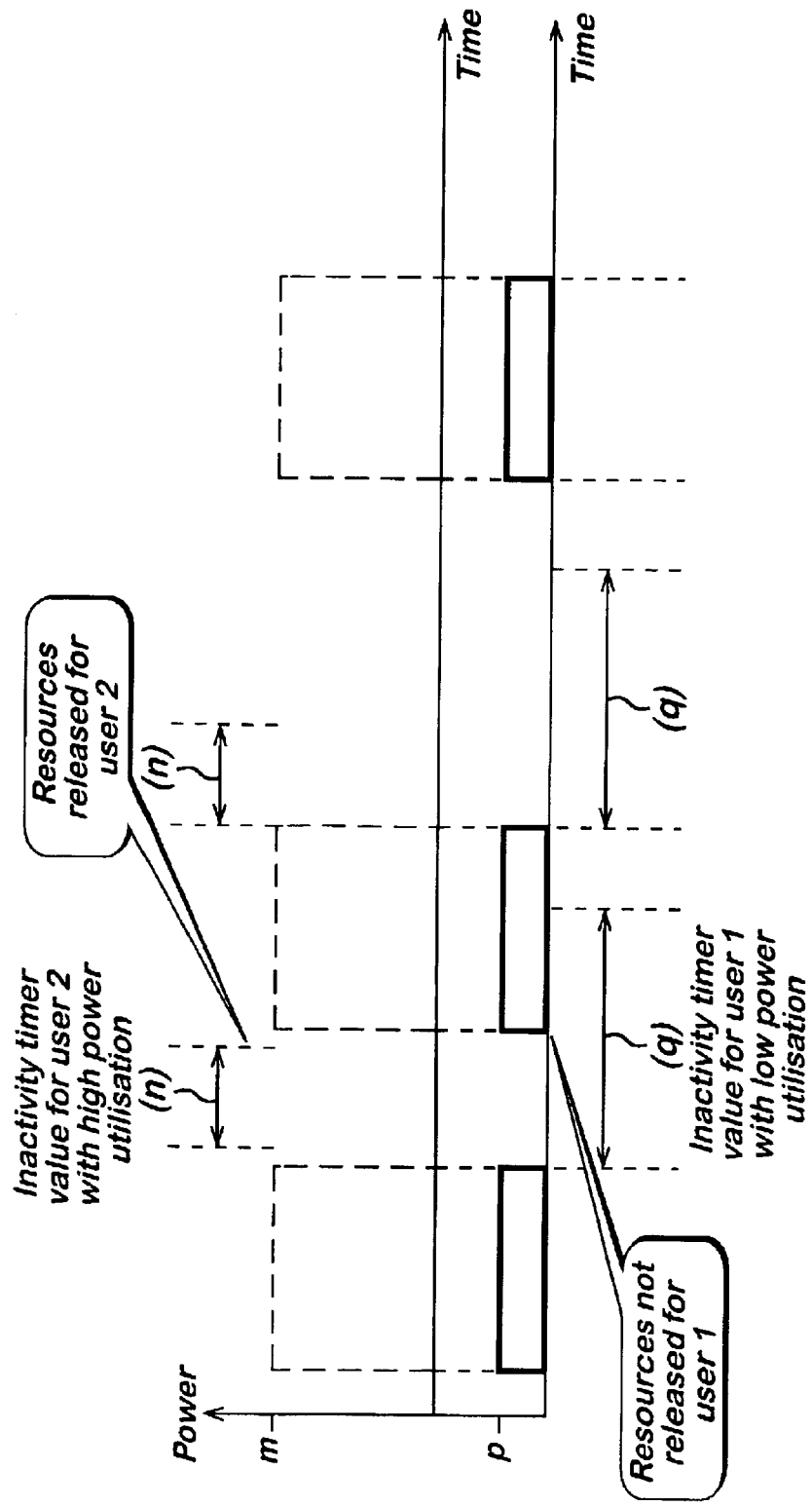

Algorithm for the proposed scheme

METHOD OF SELECTING LENGTH OF TIME OF INACTIVITY ON A CHANNEL DEDICATED TO A USER TERMINAL TO BE DETECTED FOR THE CHANNEL TO BE RELEASED, AND A CORRESPONDING NETWORK FOR RADIO TELECOMMUNICATIONS

CROSS REFERENCE TO RELATED APPLICATION

This application claims priority of Great Britain Application No. 0214518.3 filed on Jun. 24, 2002.

TECHNICAL FIELD

The present invention relates to telecommunications, and more particularly, wireless communications.

BACKGROUND OF THE INVENTION

In networks for mobile telecommunications, as regards dedicated channels, radio resources may be assigned exclusively to one user terminal for the entire time that the user is allocated the channel, regardless of whether the user terminal is using the channel or not. This is illustrated in FIG. 1.

It is known that sharing dedicated channels between user terminals enhances efficiency. This approach involves the use of an inactivity timer, whereby the network monitors the activity of all the packet-switched users, and when the network detects that there is no data activity (i.e., data communications to or from a particular user), the inactivity timer for that user terminal is started. Once the timer has been started, if the network detects activity for that particular user terminal, the timer is reset, to be re-started when the activity for that user terminal again ceases. If there is no activity for that user terminal until the expiry of the timer, the user terminal relinquishes its radio resources, though the connection with the network is still maintained. When this user has more data to send, the network allocates to the user terminal new radio resources. This approach is illustrated in FIG. 2. Using this approach, the radio resources freed by the use of the inactivity timer can then be utilised by other users. FIG. 3 is a diagram showing this.

In applications where the user traffic does not follow a predetermined traffic pattern, the user changes between the 'active' and 'inactive' states in a non-deterministic fashion. This is because the time interval between successive data activity periods varies greatly during a call.

Signalling may be required for the network to transition the user between the 'active' and 'inactive' states, with consequential use of base station transmit power. Part of the signalling to make the users change between the 'active' and 'inactive' states is performed on a (shared) signalling channel. As a signalling channel has no power control (or very crude power control), its use requires a significant amount of base station transmit power.

On the one hand, if the value of the inactivity timer is large, the transitions between the 'active' and 'inactive' states do not occur as frequently, and as a consequence, less signalling, and consequential power usage for signalling, is required; however, there is, of course, a longer delay before resources are reallocated to another user, which can be undesirable.

On the other hand for a small inactivity timer value, the user transitions back and forth between the 'active' and 'inactive' states frequently. Frequent signalling is involved to change between the two states during which a large amount of base station transmit power is required. Furthermore, there are user terminals that require less base station transmit power in the 'active' state than for signalling. With frequent signalling, the overall base station transmit power allocated for those users is higher, as illustrated in FIG. 4. This holds true for any network where the base station transmit power required for signalling is higher than the base station transmit power required by the corresponding 'active' state.

SUMMARY OF THE INVENTION

The present invention provides a method of selecting length of time of inactivity on a channel dedicated by a telecommunications base station to communications with a first user terminal to be detected for the channel to be released for use by another user terminal, the length of time being selected dependent upon the expected base station transmit power required for communications to the first user terminal. In an embodiment of the present invention, a method provides user-specific data inactivity timers for packet data services. A timer is selected for a user dependent upon the base station (i.e. downlink) power required to communicate with that user. Each user has its own customised inactivity timer value instead of fixed inactivity timer value for all the users. This contrasts with the prior art approach in which the data inactivity timer value is fixed at one value for all the users. Advantages of the present invention in its preferred embodiments are that it is possible to use the radio resources, in particular the base station transmit power, more efficiently. There is also a reduction in the excessive signalling involved in switching between active and inactive states.

Advantageously, the length is selected dependent upon the last recorded base station transmit power used for communicating with the first user terminal.

Advantageously, the higher the expected base station transmit power, the shorter the length of time selected.

Advantageously, if the user terminal power is greater than a power threshold ($t_1$) a shorter length of time is selected than otherwise. Preferably if the user terminal power is less than a further power threshold ($t_2$) which is lower than the power threshold (t1), then a longer length of time is selected than otherwise. Preferably if the user terminal power is greater than the further power threshold ($t_2$) but less than the power threshold ($t_1$), then a length of time is selected that is intermediate of said shorter length of time and said longer length of time.

Advantageously the method is undertaken for each of a plurality of first user terminals each having an associated dedicated channel for communications, so as to provide for each first user terminal an associated selected length of time.

Advantageously the method is undertaken repeatedly over time so as to enable adjustment of the length of time selected in response to a change in the expected base station transmit power. The present invention also provides a network for radio telecommunications comprising a base station and a plurality of user terminals including a first user terminal and other user terminals, the network comprising a timer associated with the first user terminal operative to determine whether a length of time of inactivity on a channel dedicated by the base station to communications with the first user terminal has been reached so as to release the channel for use by one of the other user terminals, the network comprising a selector operative to select the length of time dependent upon the expected base station transmit power required for communications to the first user terminal.

Furthermore advantageously the selector is operative to select the length dependent upon its last recorded base station transmit power used for communicating with the first user terminal.

Furthermore advantageously the selector is operative to select such that the higher the expected base station transmit power, the shorter the length of time selected. Furthermore preferably the selector is operative to select such that if the user terminal power is greater than a power threshold ($t_1$) a shorter length of time is selected than otherwise. Furthermore preferably if the user terminal power is less than a further power threshold ($t_2$) which is lower than the power threshold ($t_1$), then a longer length of time is selected than otherwise. Furthermore preferably the selector is operative to select such that if the user terminal power is greater than the further power threshold ($t_2$) but less than the power threshold ($t_1$), then a length of time is selected that is intermediate of said shorter length of time and said longer length of time.

Furthermore advantageously the selector is operative to select lengths of time to be used for each of a plurality of first user terminals each having an associated dedicated channel for communications, such that each first user terminal has an associated selected length of time.

Furthermore advantageously the selector is operative to select the or each length of time repeatedly over time so as to enable adjustment of the length of time selected in response to a change in the base station transmit power required.

Advantageously the base station is under the control of a radio network controller, the radio network controller comprising the selector.

Advantageously the radio network controller maintains a record of base station transmit power level used to the or each first user terminal, the record being updated over time, the recorded base station transmit power level being the expected base station transmit power for further communications.

BRIEF DESCRIPTION OF THE DRAWINGS

An embodiment of the present invention will now be described by way of example and with reference to the drawings, in which:

FIG. 6 is a diagram illustrating use of a user specific inactivity timer in the network shown in FIG. 5;

DETAILED DESCRIPTION

Figure 1:
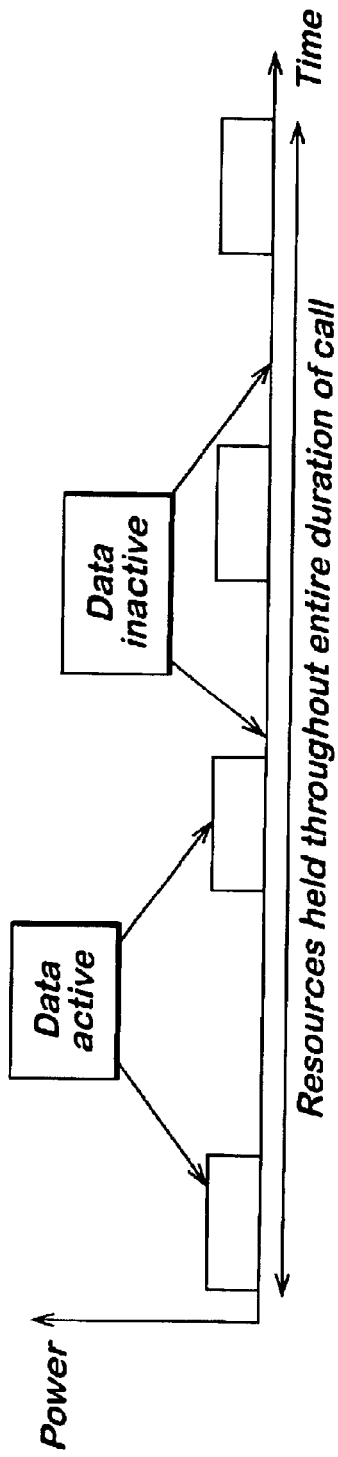
FIG. 1 is a diagram illustrating use of channel resources by dedicated channels.
Figure 2:
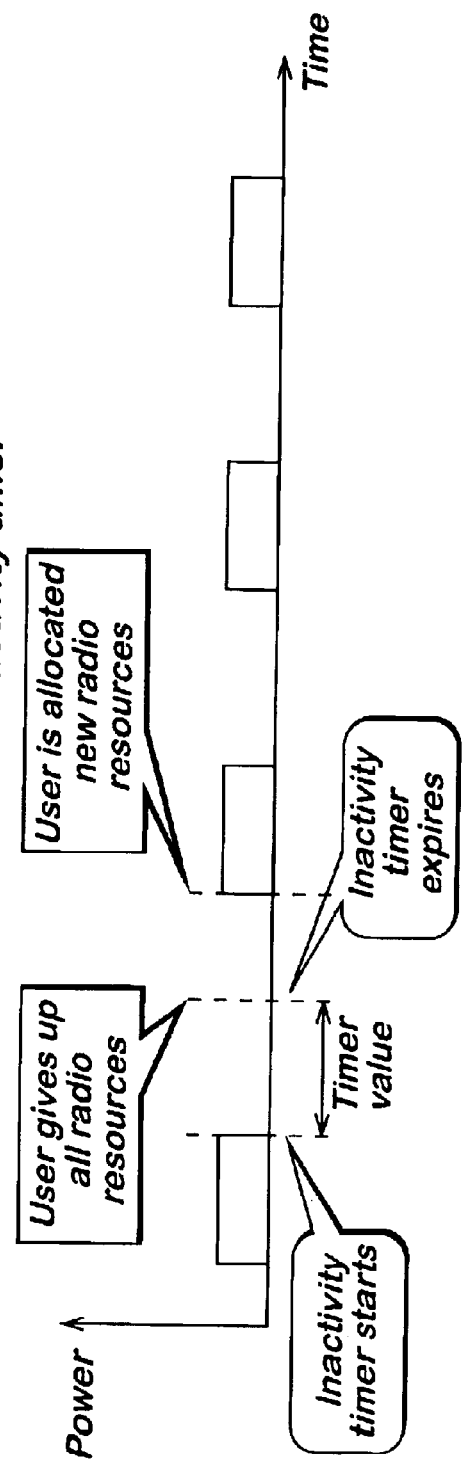
FIG. 2 is a diagram illustrating the use of an inactivity timer.
Figure 3:
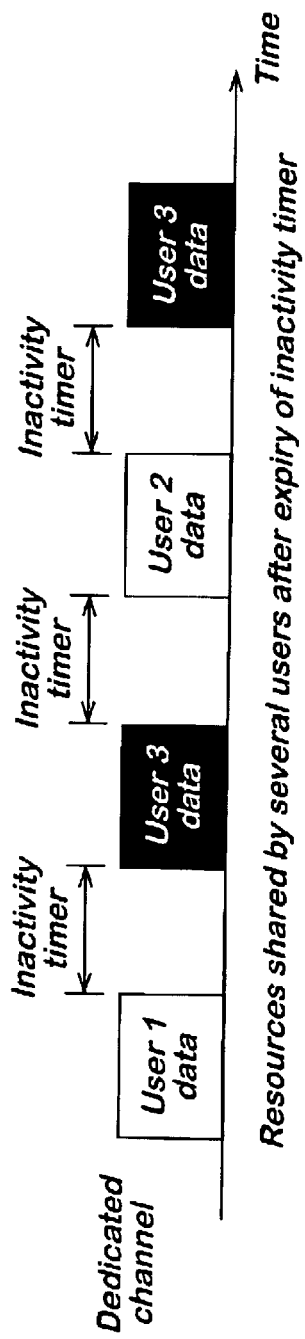
FIG. 3 is a diagram illustrating sharing dedicated channel resources via inactivity timer.
Figure 4:
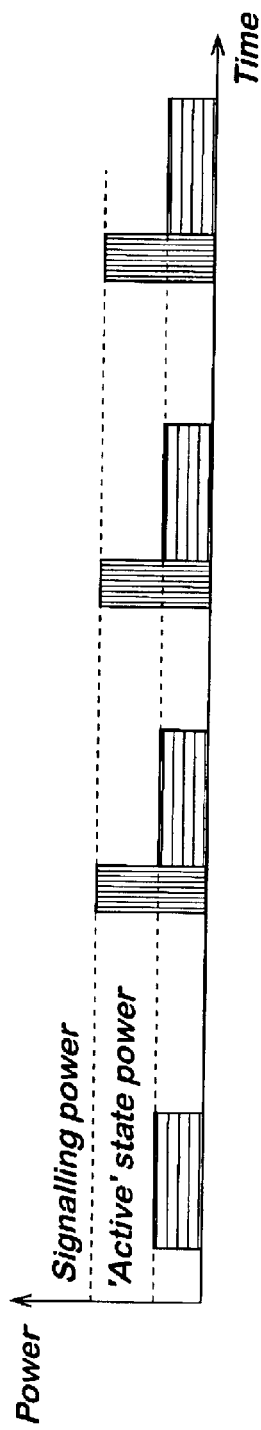
FIG. 4 is a diagram illustrating base station power duty cycle due to data inactivity.
Figure 5:
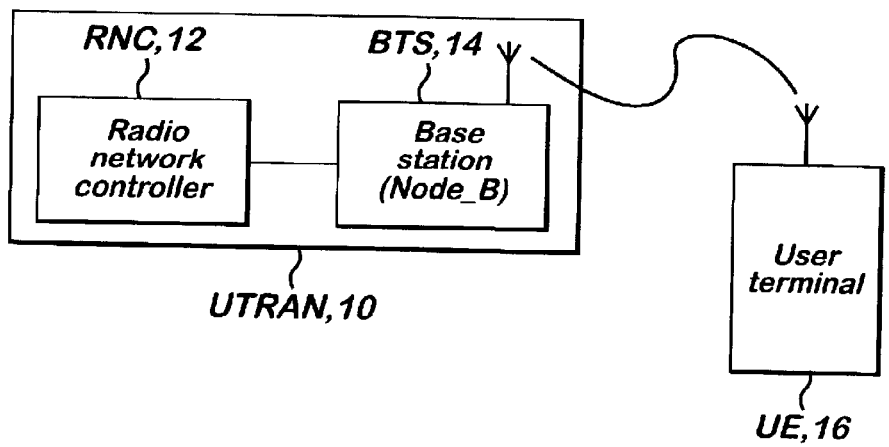
FIG. 5 is a diagram illustrating a network for mobile telecommunications.

In one embodiment of the present invention, method is provided for selecting length of time of inactivity on a channel dedicated by a telecommunications base station to communications with a user terminal to be detected for the channel to be released. The present invention also relates to a corresponding network for radio telecommunications As shown in FIG. 5, a preferred UMTS radio access network UTRAN 10 consists of a radio network controller RNC 12 which controls the operation of several base transceiver stations (base transceiver stations BTS 14, denoted NodeB in UMTS terminology, and one of which is shown in FIG. 5 for simplicity). A base transceiver station 14 communicates with a mobile user terminal (e.g., user equipment UE 16) during a call connection to that user terminal 16.

User-specific data inactivity timers are provided, i.e. each user can be assigned a different inactivity timer value. This timer value for a user terminal is selected based on the base station power required by the user terminal as illustrated in FIG. 6. If the user terminal consumes a large amount of base station power (m), then a small value (n) of inactivity timer is assigned. However, if the user terminal requires less base station power (p), then a larger value (q) of inactivity timer is assigned. As shown in FIG. 6, for user terminals (e.g., user 1, user 2) with identical activity and inactivity periods but with different power requirements, a user terminal (e.g., user 2) which demand more base station power (m), is set a shorter, e.g., lower value, inactivity timer (n). Hence, the resources utilized by a base station power-greedy user terminal will be released earlier. On the other hand, for a user terminal (e.g., user 1) utilising less base station power (p), the resources will be released later because of the larger, i.e. longer, inactivity timer (q).

The radio network controller RNC 12 keeps a record of power level used to each user terminal, and determines the timer to be applied in communications between the base station and the user terminal. The power usage of each user terminal is periodically reported back to and updated in the radio network controller RNC 12 by the respective base station.

One example implementation is as follows, being a scheme whereby a user terminal's inactivity timer is set as low, medium or high based on its power requirement.

1. If the user terminal's required base station transmit power is greater than a first power threshold ($t_1$) but less than maximum base station power, then set timer to low.
2. If the user terminal's required base station transmit power is greater than a second power threshold ($t_2$) but less than the first power threshold ($t_1$), then set timer to medium.
3. If the user terminal's required base station transmit power is greater than minimum base station power but less than the second power threshold ($t_2$), then set timer to high.

Figure 7:
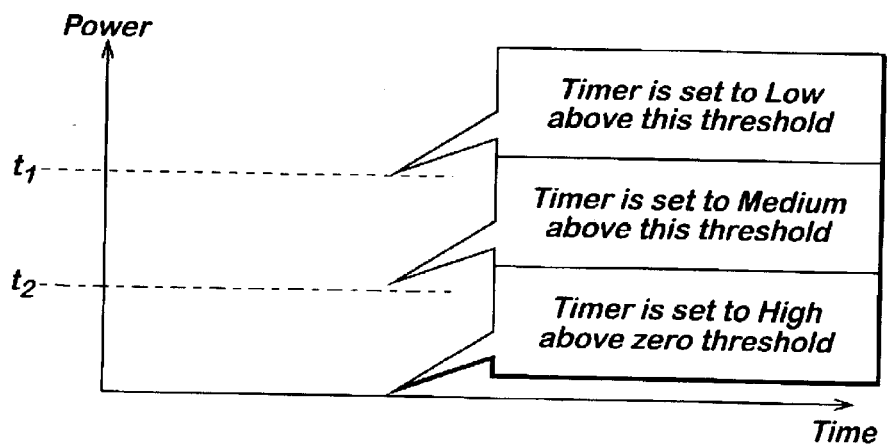
FIG. 7 is a diagram illustrating power thresholds and the corresponding inactivity timer values used in the network.

The above strategy is illustrated by FIG. 7.

Figure 8:
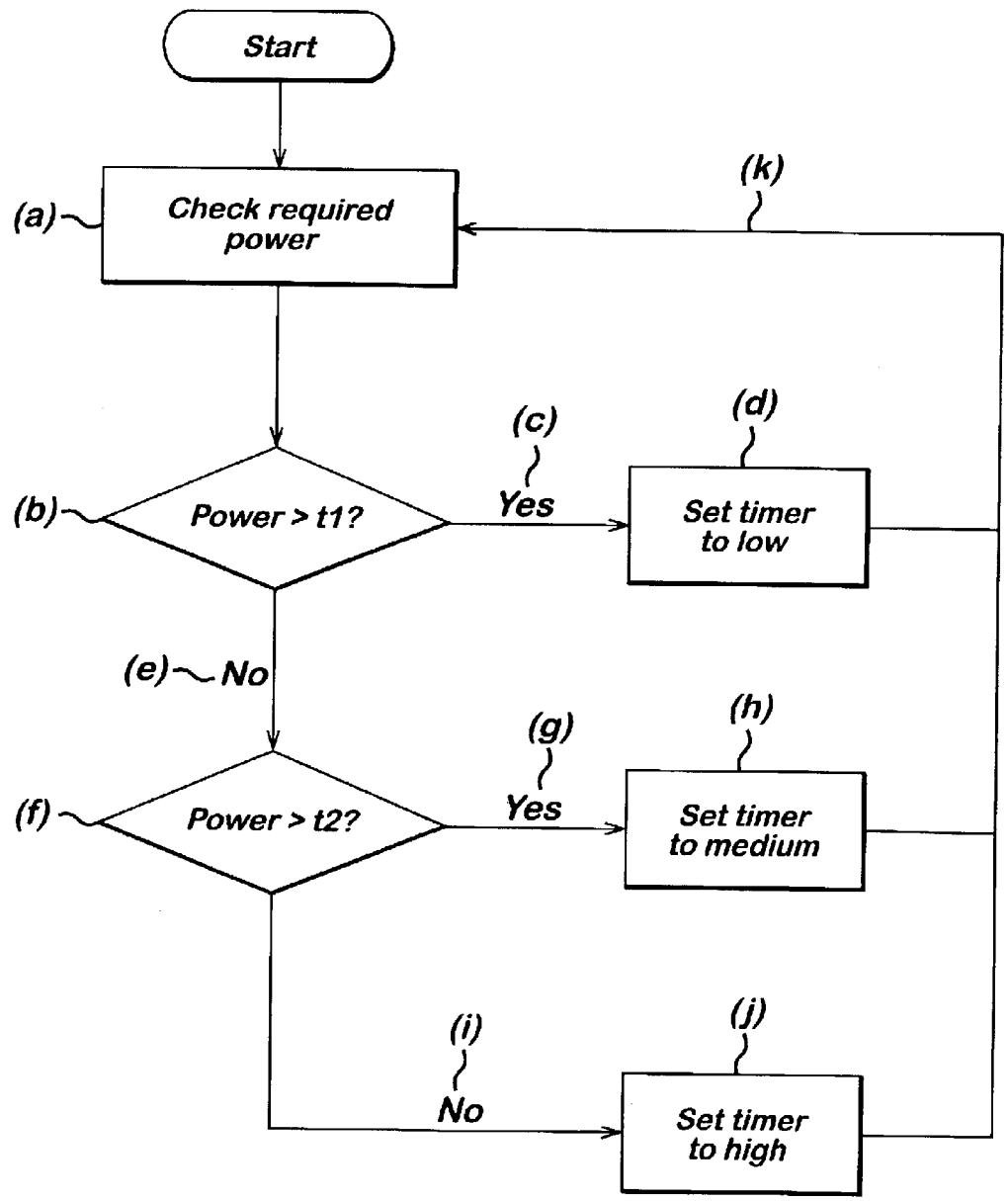
FIG. 8 is a diagram illustrating an algorithm for the inactivity timer scheme.

As shown in FIG. 8, the method steps to implement the proposed scheme are as follows. The base station transmit power to a user terminal is determined (a). A determination is made (b) as to whether that power is greater than a preselected higher power threshold t1. If (c) the power is greater than the higher power threshold t1, then (d) inactivity time-out timer to be applied is set to low, e.g., the resources are released soonest from the start of inactivity in data transfer being detected.

If (e) the power is less than or equal to the higher power threshold t1, then a determination is made (f) as to whether that power is greater or less than a preselected lower power threshold t2. If (g) the power is greater than the lower power threshold t2, then (h) inactivity time-out timer to be applied is set to medium i.e. the resources are released next soonest from the start of inactivity in data transfer being detected. If (i) the power is less than or equal to the lower power threshold t2, then (j) the inactivity time-out timer to be applied is set to high, e.g., the resources are released the longest time from the start of inactivity in data transfer being detected. In each case after the timer has been selected, (k) the base station transmit power required to the user terminal is considered again to determine whether a change in inactivity timer is required. The inactivity timer for each user terminal is thus user terminal-specific, and dynamic in the sense of changing over time in response to changing base station transmit power requirements, for example, as a user terminal traverses through a base station's cell (e.g., area of radio coverage).

While the particular invention has been described with reference to illustrative embodiments, this description is not meant to be construed in a limiting sense. It is understood that although the present invention has been described, various modifications of the illustrative embodiments, as well as additional embodiments of the invention, will be apparent to one of ordinary skill in the art upon reference to this description without departing from the spirit of the invention, as recited in the claims appended hereto. Consequently, the method, system and portions thereof and of the described method and system may be implemented in different locations, such as the wireless unit, the base station, a base station controller and/or mobile switching center. Moreover, processing circuitry required to implement and use the described system may be implemented in application specific integrated circuits, software-driven processing circuitry, firmware, programmable logic devices, hardware, discrete components or arrangements of the above components as would be understood by one of ordinary skill in the art with the benefit of this disclosure. Those skilled in the art will readily recognize that these and various other modifications, arrangements and methods can be made to the present invention without strictly following the exemplary applications illustrated and described herein and without departing from the spirit and scope of the present invention. It is therefore contemplated that the appended claims will cover any such modifications or embodiments as fall within the true scope of the invention.

What is claimed is:

1. A method of selecting length of time of inactivity on a channel dedicated by a telecommunications base station to communications with a first user terminal to be detected for the channel to be released for use by another user terminal, the length of time being selected dependent upon the expected base station transmit power required for communications to the first user terminal.

2. A method according to claim 1, wherein the length is selected dependent upon the last recorded base station transmit power used for communicating with the first user terminal.

3. A method according to claim 1, wherein the higher the expected base station transmit power, the shorter the length of time selected.

4. A method according to claim 1, wherein a shorter length of time is selected than otherwise if the user terminal power is greater than a power threshold $(t_1)$.

5. A method according to claim 4, in which if the user terminal power is less than a further power threshold $(t_2)$ which is lower than the power threshold $(t_1)$, then a longer length of time is selected than otherwise.

6. A method according to claim 5, in which if the user terminal power is greater than the further power threshold $(t_2)$ but less than the power threshold $(t_1)$, then a length of time is selected that is intermediate of said shorter length of time and said longer length of time.

7. A method according to claim 1, which is undertaken for each of a plurality of first user terminals each having an associated dedicated channel for communications, so as to provide for each first user terminal an associated selected length of time.

8. A method according to claim 1, which is undertaken repeatedly over time so as to enable adjustment of the length of time selected in response to a change in the expected base station transmit power.

9. A network for radio telecommunications comprising a base station and a plurality of user terminals including a first user terminal and other user terminals, the network comprising a timer associated with the first user terminal operative to determine whether a length of time of inactivity on a channel dedicated by the base station to communications with the first user terminal has been reached so as to release the channel for use by one of the other user terminals, the network comprising a selector operative to select the length of time dependent upon the expected base station transmit power required for communications to the first user terminal.

10. A network according to claim 9, in which the selector is operative to select the length dependent upon its last recorded base station transmit power used for communicating with the first user terminal.

11. A network according to claim 9, in which the selector is operative to select such that the higher the expected base station transmit power, the shorter the length of time selected.

12. A network according to claim 10, in which the selector is operative to select such that if the user terminal power is greater than a power threshold $(t_1)$ a shorter length of time is selected than otherwise.

13. A network according to claim 12, in which if the user terminal power is less than a further power threshold $(t_2)$ which is lower than the power threshold $(t_1)$, then a longer length of time is selected than otherwise.

14. A network according to claim 13, in which the selector is operative to select such that if the user terminal power is greater than the further power threshold $(t_2)$ but less than the power threshold $(t_1)$, then a length of time is selected that is intermediate of said shorter length of time and said longer length of time.

15. A network according to claim 9, in which the selector is operative to select lengths of time to be used for each of a plurality of first user terminals each having an associated dedicated channel for communications, such that each first user terminal has an associated selected length of time.

16. A network according to claim 9, in which the selector is operative to select the or each length of time repeatedly over time so as to enable adjustment of the length of time selected in response to a change in the base station transmit power required.

17. A network according to claim 9, in which the base station is under the control of a radio network controller, the radio network controller comprising the selector.

18. A network according to claim 9 in which the radio network controller maintains a record of base station transmit power level used to the or each first user terminal, the record being updated over time, the recorded base station transmit power level being the expected base station transmit power for further communications.

* * * * *